United States Patent
Uscilowski et al.

(10) Patent No.: US 9,251,261 B2
(45) Date of Patent: Feb. 2, 2016

(54) METHOD AND SYSTEM FOR METADATA DRIVEN TESTING OF MALWARE SIGNATURES

(71) Applicant: Symantec Corporation, Mountain View, CA (US)

(72) Inventors: Bartlomiej Uscilowski, Ratoath (IE); Costin Ionescu, Dublin (IE); Thomas Parsons, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 149 days.

(21) Appl. No.: 14/042,342

(22) Filed: Sep. 30, 2013

(65) Prior Publication Data

US 2015/0096021 A1 Apr. 2, 2015

(51) Int. Cl.
*G06F 11/00* (2006.01)
*G06F 17/30* (2006.01)
*G06F 21/56* (2013.01)

(52) U.S. Cl.
CPC .... *G06F 17/30864* (2013.01); *G06F 17/30427* (2013.01); *G06F 17/30598* (2013.01); *G06F 21/564* (2013.01); *G06F 21/56* (2013.01); *G06F 2221/033* (2013.01)

(58) Field of Classification Search
CPC .............................. G06F 21/56; G06F 17/3086
USPC ........................................................ 726/22–25
See application file for complete search history.

(56) References Cited

U.S. PATENT DOCUMENTS

| | | | | |
|---|---|---|---|---|
| 5,452,442 A * | 9/1995 | Kephart | ....................... | 714/38.1 |
| 7,290,282 B1 * | 10/2007 | Renert et al. | .................... | 726/24 |
| 8,214,977 B2 * | 7/2012 | Szor | ................................. | 26/24 |
| 8,239,944 B1 * | 8/2012 | Nachenberg et al. | ........... | 726/23 |
| 8,239,948 B1 * | 8/2012 | Griffin et al. | .................... | 726/24 |
| 8,312,537 B1 * | 11/2012 | Nachenberg et al. | ........... | 726/22 |
| 8,607,349 B1 * | 12/2013 | Zaitsev | ............................ | 726/24 |
| 8,875,292 B1 * | 10/2014 | Bogorad et al. | .................... | 726/24 |
| 2012/0095958 A1 * | 4/2012 | Pereira et al. | ................. | 707/609 |
| 2012/0240236 A1 * | 9/2012 | Wyatt et al. | ..................... | 726/25 |
| 2014/0053261 A1 * | 2/2014 | Gupta et al. | .................... | 726/22 |

* cited by examiner

*Primary Examiner* — Nirav B Patel
(74) *Attorney, Agent, or Firm* — Patterson + Sheridan

(57) ABSTRACT

Techniques are disclosed for evaluating the effectiveness of a malware signature. A query tool translates a markup language malware signature definition into a database query. The query is then executed against a database of application features to identify software packages that the signature would identify as malware. The results of the query are compared with threat information stored in the database and classified as being true/false positives and true/false negatives.

22 Claims, 6 Drawing Sheets

500

```
threat_name:  threat1
threat_type:  trojan
features:
    - and/or:
        - feature1:  value1
        - feature2:  value2
    - and/or:
        - feature3:  "value3"
        - feature3:  "value4"
```

```
SELECT apkID FROM apk
WHERE feature1 = 'value1'
AND/OR feature2 = value2
UNION
SELECT apkID FROM apk
WHERE apkID IN
(
        SELECT apkID FROM apk
        WHERE feature3 = 'value3'
)
AND/OR apkID IN
(
        SELECT apkID FROM apk
        WHERE feature3 = 'value4'
)
```

FIG. 6

METHOD AND SYSTEM FOR METADATA DRIVEN TESTING OF MALWARE SIGNATURES

BACKGROUND

1. Field

Embodiments of the invention provide techniques for testing the effectiveness of a malware signature. More specifically, embodiments presented herein disclose a metadata driven approach for efficiently identifying true/false positives and true/false negatives made by a candidate malware signature.

2. Description of the Related Art

"Malware" generally refers to malicious software applications configured to disrupt computer operation, gather sensitive information, or gain unauthorized access or control of a computing system. While the effect of malware can is be relatively benign, malware is increasingly used by criminals seeking to gather private information (e.g., banking credentials) or take control of computing systems to create "botnets." Further, while malware has typically been directed to conventional computing systems (e.g., desktop and laptop systems running versions of the Windows® operating system), the dramatic rise of mobile telephones and tablets has expanded the systems targeted by malware. For example, mobile telephones and tablets provide considerable computing power and network connectivity. Further, the widespread use of online application marketplaces to distribute software (commonly referred to as "apps") has come to provide a significant vector for distributing malware to mobile devices. Once installed, such malware can exploit vulnerabilities to gain control of a device, capture sensitive information, (e.g., banking app usernames and passwords). Similarly, malware apps can be distributed as legitimate applications, and rely on "social engineering" to trick individuals into installing, using, and providing information.

Given the well-known threat of malware, significant research and development has gone into preventing, detecting, and cleaning malware from computing systems. For example, in addition to mechanisms for updating software vulnerabilities in applications obtained from online marketplaces, a variety of scanning and analysis applications are used to detect the presence of malware, as well as prevent it from being installed. Typically, such software relies on a set of signatures to detect malware. Each signature is composed to identify a set of distinct features of a given malware package. As a result, the effectiveness of malware detection tools directly depends on the quality of the signatures. As new malware packages are identified, new signatures have to be created and evaluated.

SUMMARY

One embodiment presented herein provides a method for evaluating malware signatures. This method may generally include receiving a candidate malware signature specified in a markup language, translating the candidate malware signature into a database query, and executing the database query to identify a set of applications detected by the candidate malware signature as being an instance of a malware threat corresponding to the candidate malware signature. For each application in the set of applications, the method includes determining whether the application was correctly identified by the candidate malware signature as instance of the malware threat.

In particular embodiments, the method may further include determining a number of false-positive malware detections made by the candidate malware signature, determining a number of false-negative malware detections made by the candidate malware signature, and generating a profile measuring a performance of the candidate malware signature in detecting the malware threat corresponding to the candidate malware signature.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 5 illustrates an example malware signature, according to one embodiment.

FIG. 6 illustrates a translation of the malware signature shown in FIG. 5 into a database query, according to one embodiment.

DETAILED DESCRIPTION

Figure 1:
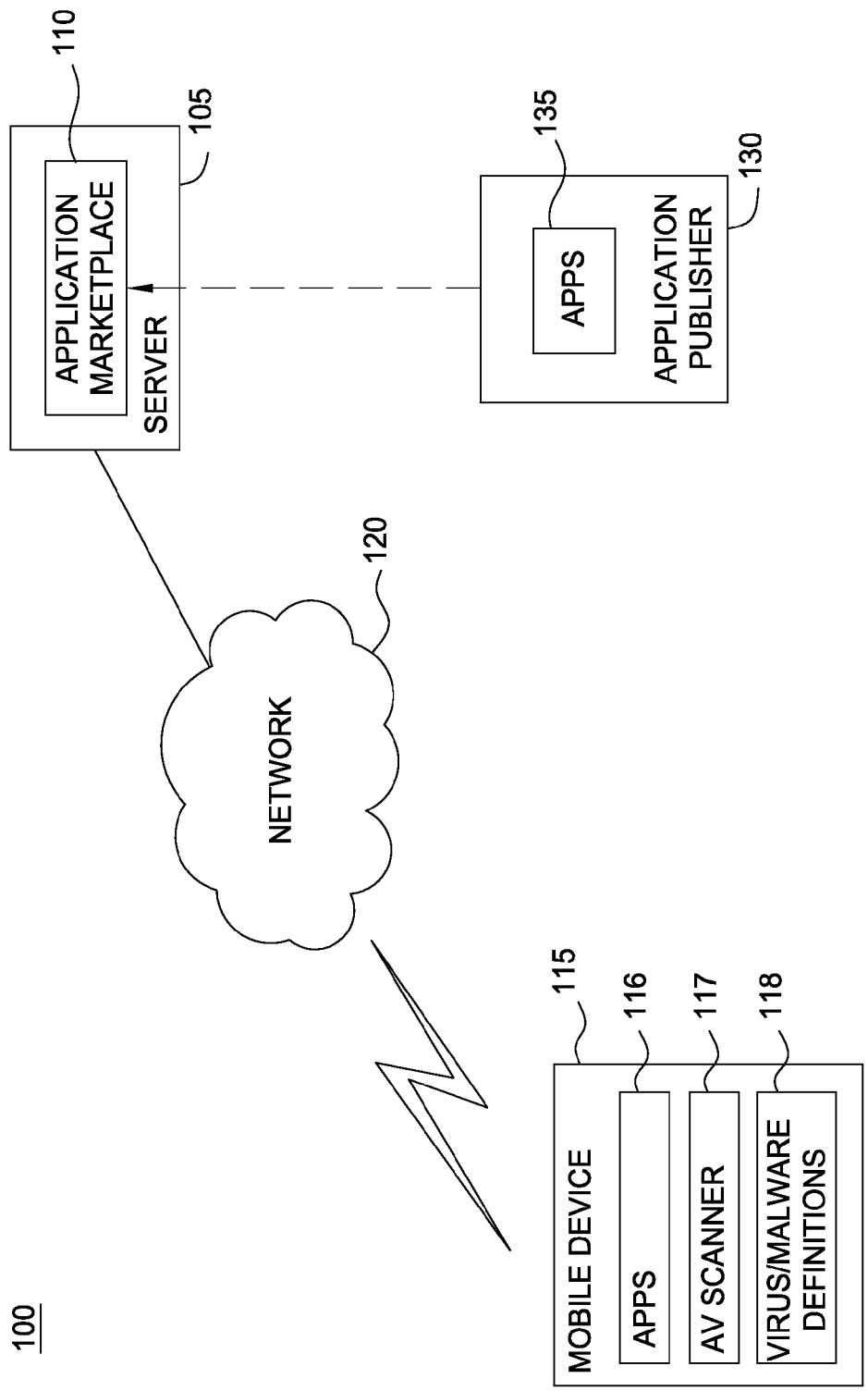
FIG. 1 illustrates an example computing environment, according to one embodiment.

Currently, malware signatures are tested by scanning a large set of known malicious and clean files using anti-virus (AV) software. In the case of mobile malware signatures such scanning occurs by running the AV software on mobile telephone or an emulator of such hardware. While this approach works, it has several shortcomings. First, the number of available software packages now distributed by online marketplaces is in the millions (and growing). Scanning this number of packages in the traditional manner requires large computational resources and considerable time. Further, the proliferation of hardware devices, operating systems, and versions of operating systems can require the same signature to be tested using the AV software on a per-device (or per emulator) basis. As a result, new malware definitions may end up being delivered to customers only infrequently. Further, this approach increases the time between a new malware package being identified and the release of an effective signature to identify that package. Ideally however, due to the nature of malware infections, signature updates should be delivered to customers as rapidly as possible.

At the same time, signatures need to be tested to determine not only whether a signature correctly identifies a given malware target, but whether the signature also identifies other, non-malicious software packages. That is, the signature needs to be evaluated for false-positives against the application packages available for a mobile device. False-positives are a significant issue for providers of AV software, as AV software should not identify legitimate software packages as being malware. Conversely, AV software can be highly effective, despite some false-negatives, so long as the AV software correctly identifies a large percentage of malware packages.

Embodiments of the invention provide techniques for rapidly testing the effectiveness of a malware signature. As described in greater detail below, a metadata driven approach is used to determine how well a candidate signature will correctly identify malware, i.e., to determine true/false positive rates and true/false negative rates of performance for a malware signature. Further, the approaches presented herein allow a candidate signature to be tested against millions of mobile application packages (or "apps") in minutes rather than hours using a fraction of resources required for a traditional scan of physical files.

In one embodiment, a database is used to store features or characteristics of a collection of software packages, such as the packages or mobile "apps" available from an online marketplace. In addition to a set of features, the database may characterize each package as being either legitimate or an example of a particular malware package. The malware signatures may be composed using a markup language (e.g. YAML). In such a case, each signature specifies a set of features that may be used to detect the malware package corresponding to the signature. As is known, malware signatures may be composed algorithmically by analyzing a software package known to represent a given malware threat or by subject matter experts. Further, such a signature may be "generic" in that it will, hopefully, detect different even unknown variations of a given malware threat or may be tailored to identify a specific version or instance of a malware threat.

When a new malware signature is created, or at specified time intervals, the malware signature is translated into a database query based on the features identified in the signature. In one embodiment, the query is then executed against the database of mobile application features to identify software packages that the signature would identify as malware. The results of the query are compared with threat information stored in the database and classified as being true/false positives and true/false negatives. By building the application feature database and converting a candidate malware signature to a database query, a list of "apps" or packages detected by the candidate signature may be obtained by running a query against a database. Doing so avoids the brute force approach of using the candidate signature and AV scanner to scan a collection of files. Further, a database query may be expected to run in seconds and to scale well with the increase of the number of applications.

Using the conventional file scanning approach, the time required for scanning depends on the number of scanned application packages/files. In contrast, the processing time of techniques presented herein do not depend on the number of application packages, i.e., adding thousands of new apps every day does not noticeably increase the processing time.

Note, embodiments of the invention are presented herein using malware signatures configured to evaluate mobile device "apps" or application packages obtained from an online marketplace as a reference example of a metadata driven approach used to evaluate malware signature. Of course, one of ordinary skill in the art will recognize that embodiments presented herein may be adapted to evaluate candidate signatures for AV software designed for other computing platforms (e.g., desktop PCs) as well as to evaluate candidate signatures against software packages from other sources.

FIG. 1 illustrates an example computing environment 100, according to one embodiment. The computing environment 100 generally illustrates a mobile device 115 configured to access an application marketplace 110 hosted by a server 105. As shown, an application publisher 130 may publish applications (e.g., app 135) to the application marketplace 110. Well known examples of application marketplaces 110 include the Google Play® marketplace and the Android Pit marketplace, both of which host apps for Andorid® devices. Once published, users can download applications from the marketplace 110 which are installed on mobile device 115 (shown in FIG. 1 as "apps" 116). Typically, apps 135 published to the application marketplace 110 are legitimate. However, a significant volume of malware is distributed via application marketplaces 110. To help address the threat of such malware, mobile device 115 may include an AV scanner 117 and a set of virus/malware definitions 118. In practice, the AV scanner 117 can evaluate files on the mobile device 115 using the virus/malware definitions to identify files, applications packages, etc., that host malware corresponding to any of the signatures in the virus/malware definitions 118.

As noted, the effectiveness of the AV scanner 117 relies on the accuracy (and completeness) of the virus definitions 118. Accordingly, a provider of AV scanner 117 needs to evaluate a candidate signature to determine how accurately the signature will identify a given malware threat, as well as whether a candidate signature will result in any false positives. That is, prior to updating the virus definitions 118, the provider needs to determine whether the candidate signature will incorrectly identify legitimate software packages as being an instance of a given malware threat.

Figure 2:
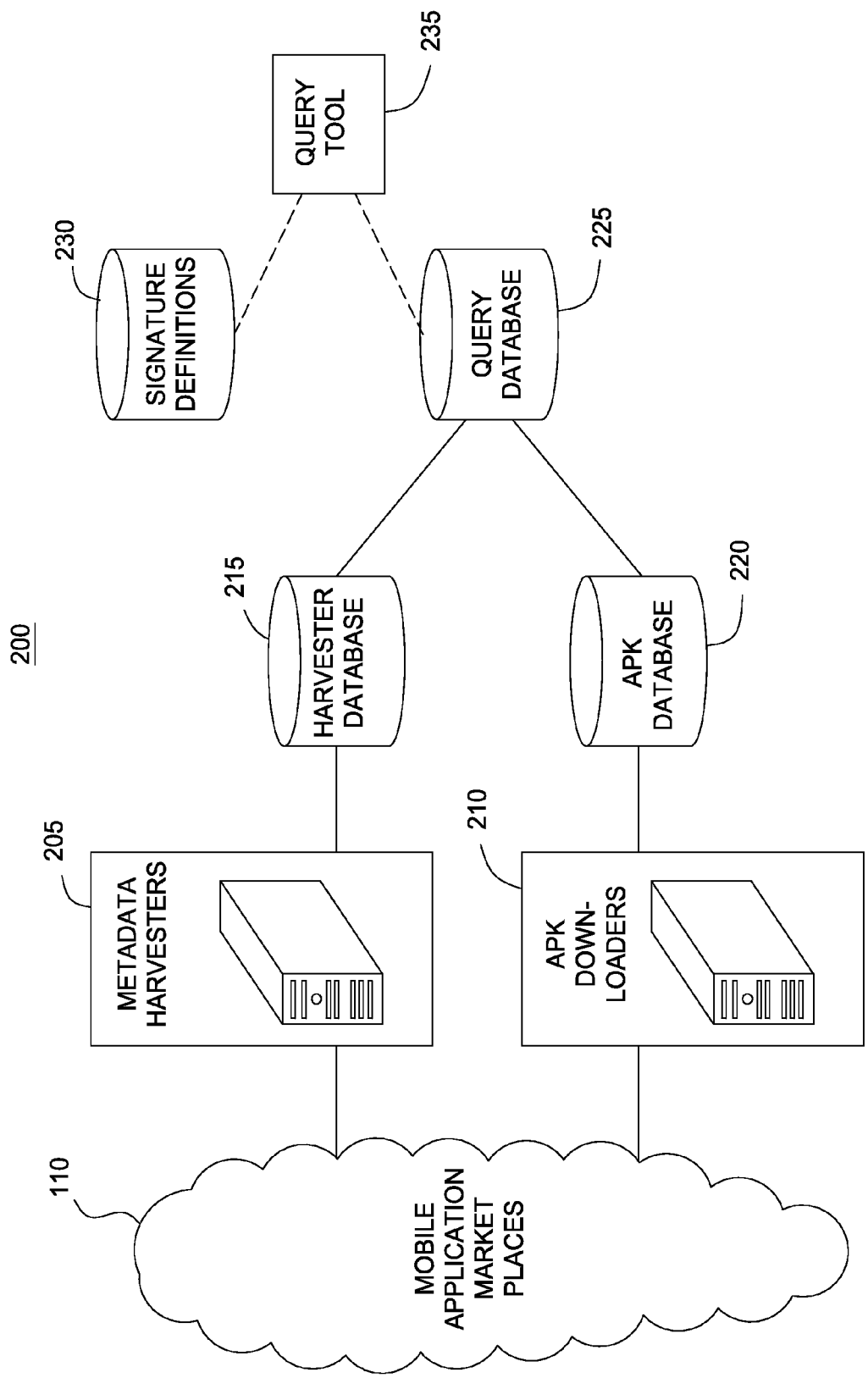
FIG. 2 illustrates a computing infrastructure used to rapidly evaluate the effectiveness of a malware signature, according to one embodiment.

FIG. 2 illustrates a computing infrastructure 200 used to rapidly evaluate the effectiveness of a malware signature, according to one embodiment. As shown, the computing infrastructure 200 includes a collection of metadata harvesters 205 and application package (APK) downloader systems 210, both used to access mobile application marketplaces 110. In one embodiment, the metadata harvester 205 provides one or more computing systems configured with application software that accesses mobile application marketplaces 110 to obtain metadata characterizing applications (or "apps") available form a given application marketplace 110.

For example, the metadata harvesters 205 may crawl the mobile application marketplaces 110 to obtain package name, cryptographic hashes or checksums (which may be calculated on full application packages or on parts of packages), binary strings extracted from applications packages. The metadata harvesters 205 may also evaluate binary files (and program source code) to determine programmatic information about a package, such as names of object-oriented classes, methods, scripts, file manifests, supporting object libraries, and the like. Further, metadata harvesters 208 may obtain metadata about a package available from an application marketplace 110, such as the number of times an "app" has been downloaded, user-rankings or feedback, application popularity, whether an application is distributed for free or for a fee, how long an application has been available in one of the marketplaces 110, the publisher of an application, and the like. Information obtained by the metadata harvesters 205 is stored in harvester database 215.

The APK downloader systems 210 provide computing systems configured with software that downloads application packages (APKs) from the application marketplaces 110. Such APKs may include binary executable files as well as icons, images, audio files, etc. APKs may in some cases include source code or executed scripts (e.g., java JAR files or Python source files executed using a Python interpreter). Application packages stored in the APK database 220 are correlated with the application metadata in the harvester database 215. That is, information in the harvester database 215 related to a specific application package is associated with an actual copy of that application package stored in the APK database 220. Note, while shown as a database, APK database 220 may also be a file system storing application packages in folders on a disk or SSD drive.

A query database 225 extracts information from the harvester database 215 and APK database 220. That is, the query database 225 consolidates application packages and metadata, making it accessible to query tool 235. In addition to storing application packages (from APK database 220) and application metadata (from harvester database 215), the query database 225 may also indicate a "ground truth" state for application packages. Such a "ground truth" state may indicate whether each given package is legitimate software or hosts a malware threat (or is otherwise compromised). As described in greater detail below, the "ground truth" state is used to evaluate the effectiveness of a candidate malware signature. Note, the query database 225 (as well as databases 215, 220, and 230) may be implemented as an SQL database, but other database technologies may be used, e.g., NO-SQL, XML, etc.

The signature definitions database 230 stores a set of malware signatures. In one embodiment, e.g., the signature definitions may be composed using a markup language such as YAML. In such a case, the query tool 235 may be configured to translate a given YAML signature definition into a database query executed against query database 225. Importantly, the signature definitions in database 230 characterize malware threats using feature types corresponding to the features extracted by the metadata harvester 205. Accordingly, to determine whether a given signature will identify an application package as malware, the query tool 235 compares the features identified in a signature definition with the features extracted by the metadata harvester 205.

In one embodiment, the query tool 235 translates a candidate signature definition into a database query. An example of a signature definition and corresponding database query are shown in FIG. 5 and FIG. 6, respectively. Once translated, the query tool 235 executes the query against the database 225 to identify which application packages are detected as malware by the candidate signature. The applications identified as malware are then compared with the "ground truth" information stored in the query database 225. If a candidate signature generates false-positive detections, such a signature can be revised or refined by a subject matter expert to exclude the false positives results, while retaining accurate detections of malware. A poorly performing signature may also simply be rejected. Similarly, a candidate signature can be evaluated for accuracy. That is, a candidate signature may be evaluated to determine whether that signature accurately identifies instances of a malware threat. Similarly, in an appropriate case, a candidate malware signature may be used to challenge a "ground truth" state for an application. For example, an application presumed to be legitimate may later be exposed to be malware taking advantage of a previously unknown exploit.

In each of these cases, because the malware signatures are converted into database queries, a candidate signature may be rapidly evaluated against the applications represented in the query database 225. Such an evaluation reveals whether the signature correctly identifies instances of malware as well the occurrence of false-positives and false-negatives, relative to a "ground truth" state for a given application package. Doing so allows a provider of AV scanner 117 to decide whether to revise, reject, or publish a candidate signature, while greatly reducing both the time required to perform the evaluation as well as the computing resources needed to do so.

Figure 3:
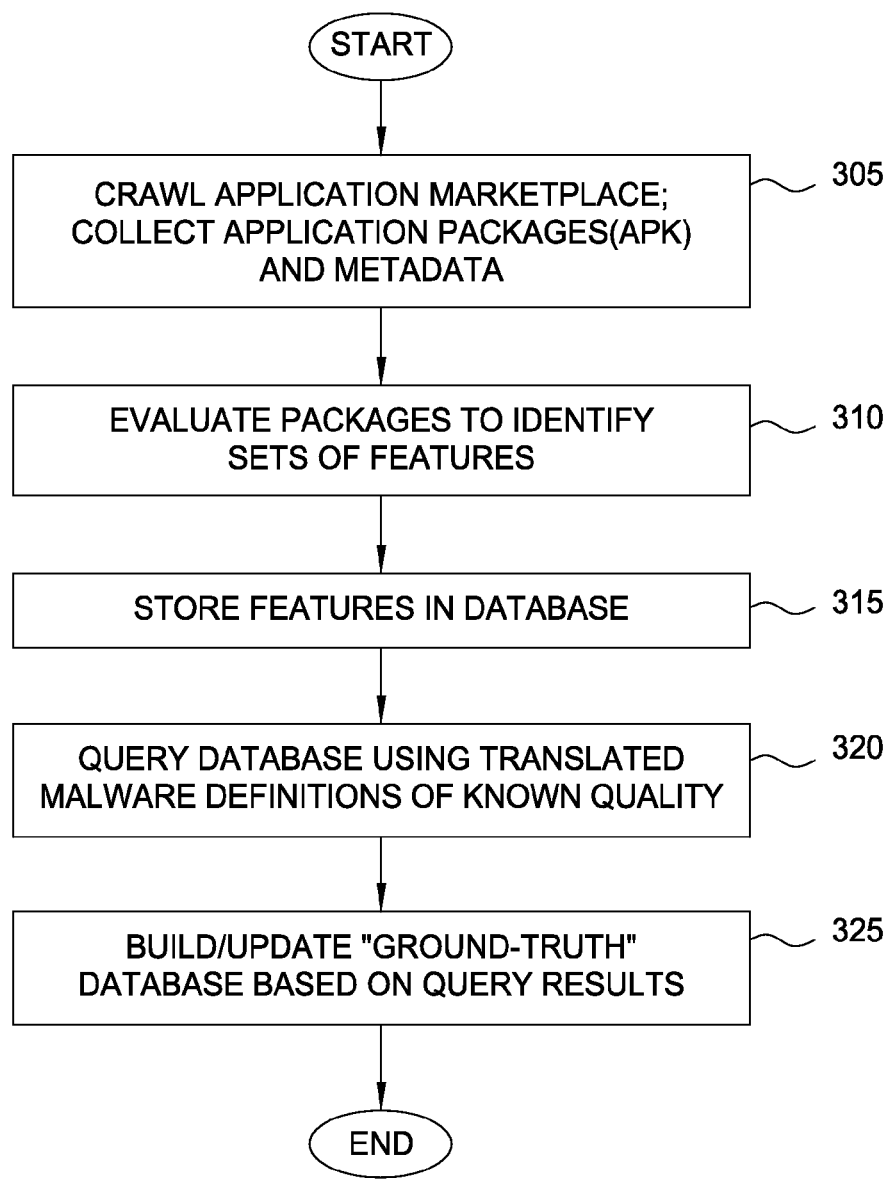
FIG. 3 illustrates aspects of a method for evaluating malware signatures, according to one embodiment.

FIG. 3 illustrates aspects of a method for evaluating malware signatures, according to one embodiment. As shown, the method 300 begins at step 305, where metadata harvester 205 and APK downloader system 210 crawl an application marketplace 110 to collect application packages and metadata 205. Once collected the metadata harvester 205 evaluates the packages to identify features associated with each respective application package. As noted, e.g., the harvester database by obtain package name, cryptographic hashes, strings, object-oriented classes, methods, scripts, file manifests, supporting object libraries, along with metadata describing download counts, user feedback, and the like.

At step 315, the packages downloaded from the application marketplaces, and the metadata and features characterizing such packages, are stored in a database. At step 320, the database is queried using a set of malware definitions. In one embodiment, the malware definitions are ones known to be effective at identifying a specific malware threat, while also generating few (or no) false-positives. At step 325, the results of the queries executed at step 325 are used to create or update a ground-truth database. In addition, the "ground-truth" database may be updated with applications known to be an instance of a given malware threat, as well as with applications known to be legitimate applications from a reliable publisher. In both cases, the malware signatures can be evaluated against both the known malware instances and known legitimate applications.

Figure 4:
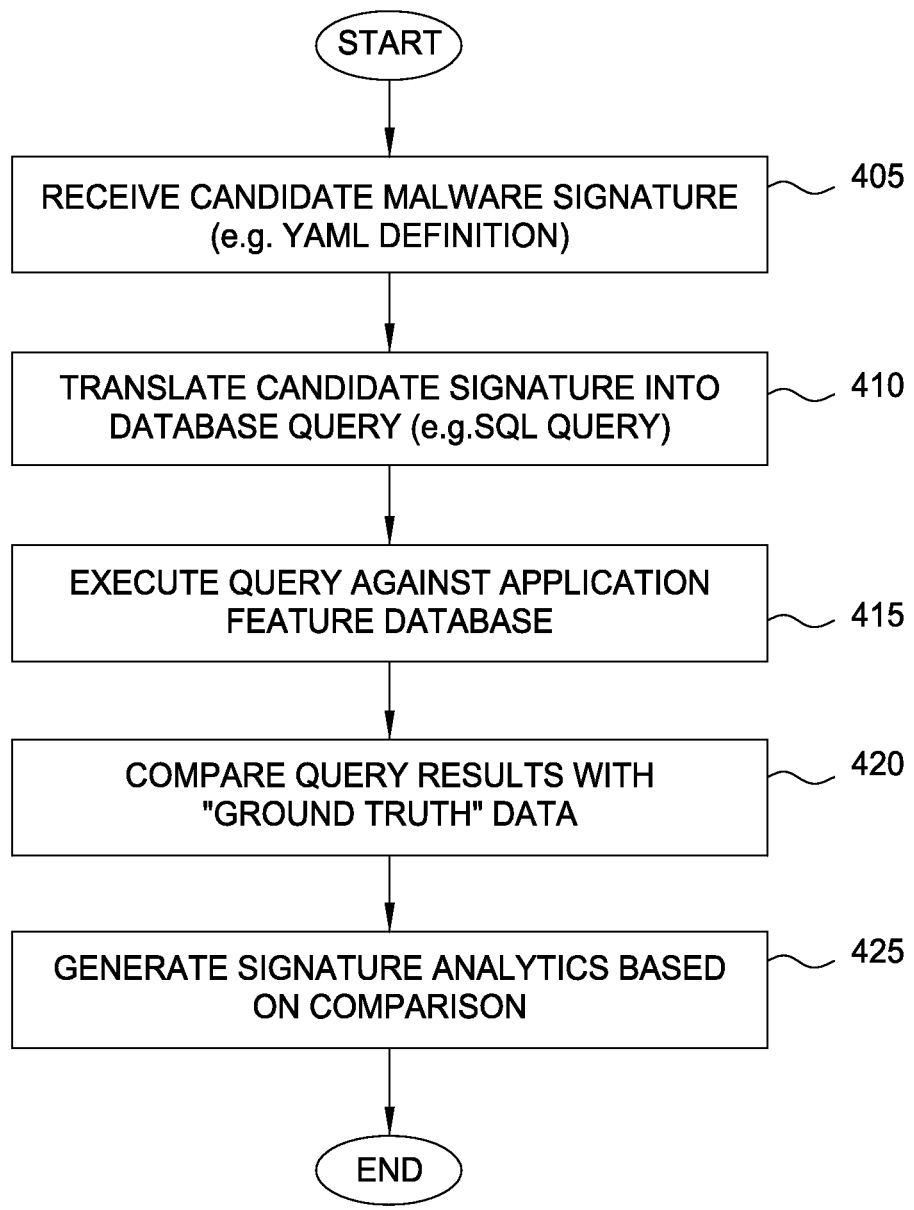
FIG. 4 further illustrates aspects of a method for evaluating malware signatures, according to one embodiment.

FIG. 4 further illustrates aspects of a method 400 for evaluating malware signatures, according to one embodiment. As shown, the method 400 begins at step 405, where the query tool receives a candidate malware signature to evaluate. As noted, such a signature may be composed using a markup language and specify a collection of features expected to correctly identify instances of the malware threat corresponding to the candidate signature, without also identifying application packages that are not an instance of the malware threat.

For example, FIG. 5 illustrates an example signature definition 500 for a malware threat named "Threat1." In this example, the signature definition 500 is composed to be consistent with the YAML markup language standard. The definition 500 specifies that the "Threat1" malware threat has a type of "Trojan." Additionally, this example definition specifies that instances of the "Threat1" malware can be identified by packages having both (i) one of two feature values and (ii) a value for a string. Specifically, packages having metadata values for "feature1" and/or "feature2" specified by definition 500 and a string of "value3" and/or "value4" are identified as malware. The features in the first group could be, e.g., the name of a package, a hash value, or other metadata about an APK. Again, the values of "feature1" "feature2," and the values of strings of "feature3" correspond to features extracted by the metadata harvester from packages available from an application marketplace.

At step 410, the query tool translates the malware definition received at step 405 into a set of one or more database queries. For example, FIG. 6 illustrates a translation of the malware signature 500 shown in FIG. 5 into a database query, according to one embodiment. In the example of FIG. 6, the malware definition 500 is translated into an SQL relational query. In the example query 600, a result set is generated that identifies a set of application IDs ("apkIDs") corresponding to applications which the features specified by the signature definition. Specifically, executing the query 600 generates a set of "apkIDs" corresponding to applications in the query database satisfy the criteria specified in signature 500.

At step 420, the query results are compared with a "ground truth" database. More specifically, the query results provide a set of applications identified by the signature as being an instance of a given malware threat. This set of applications is compared with the "ground truth" database to see whether each such application was (i) correctly identified as an instance of malware, (ii) a false-positive, or (iii) false-negative (all relative to the "ground truth" database). At step, 425, the query tool can generate a set of signature analytics profiling the performance of the candidate signatures. Based on the analytics, a signature may be revised or refined by a subject matter expert or simply rejected if the false positive rate exceeds a specified threshold (whether defined as a percentage or absolute number).

Figure 7:
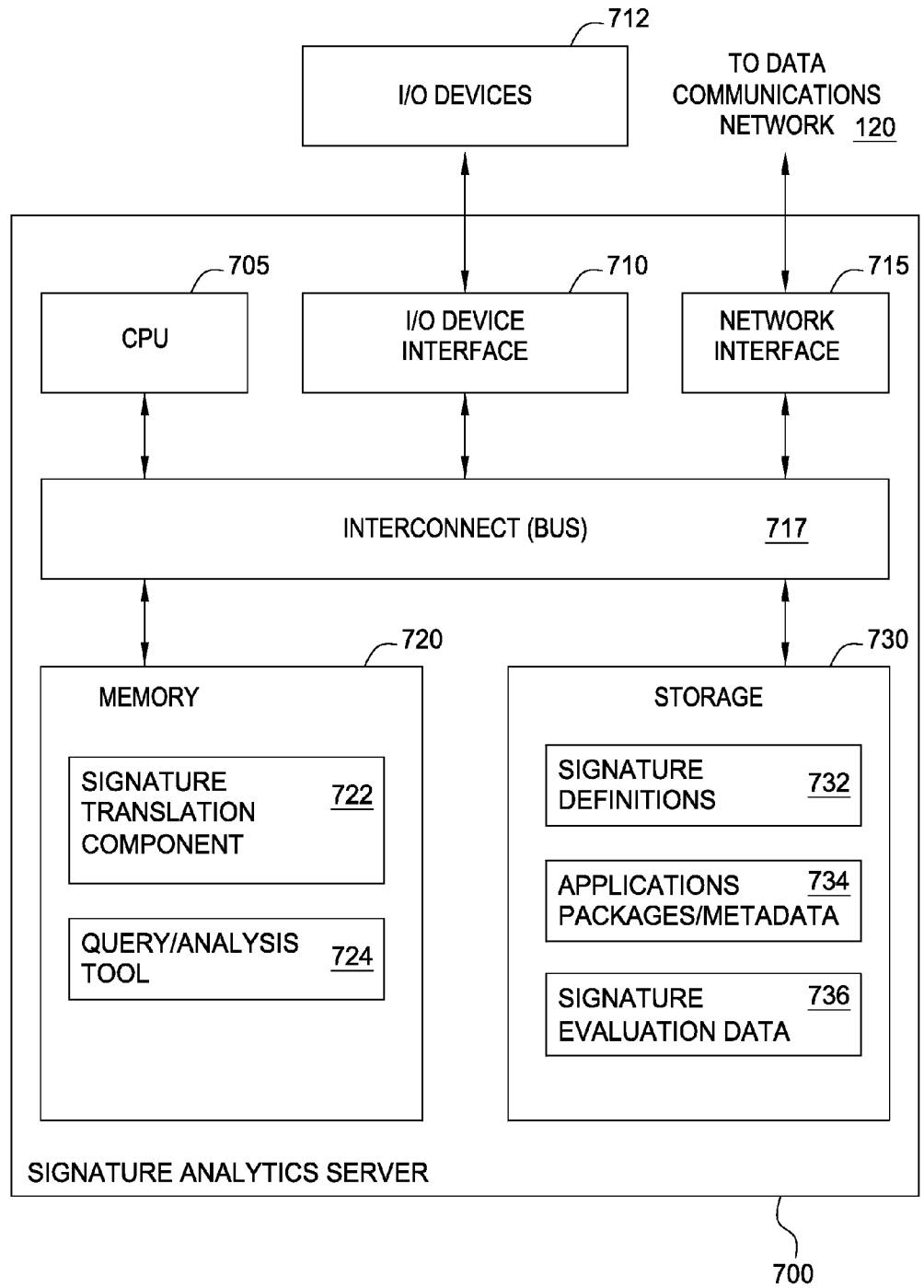
FIG. 7 illustrates an example computing system configured to rapidly evaluate the effectiveness of a malware signature, according to one embodiment.

FIG. 7 illustrates an example computing system 700 configured to rapidly evaluate the effectiveness of a malware signature, according to one embodiment. As shown, the computing system 700 includes, without limitation, a central processing unit (CPU) 705, a network interface 715, a memory 720, and storage 730, each connected to a bus 717. The computing system 700 may also include an I/O device interface 710 connecting I/O devices 712 (e.g., keyboard, mouse, and display devices) to the computing system 700. Further, in context of this disclosure, the computing elements shown in computing system 700 may correspond to a physical computing system (e.g., a system in a data center) or may be a virtual computing instance executing within a computing cloud.

The CPU 705 retrieves and executes programming instructions stored in the memory 720 as well as stores and retrieves application data residing in the memory 730. The interconnect 717 is used to transmit programming instructions and application data between the CPU 705, I/O devices interface 710, storage 730, network interface 715, and memory 720. Note, CPU 705 is included to be representative of a single CPU, multiple CPUs, a single CPU having multiple processing cores, and the like. And the memory 720 is generally included to be representative of a random access memory. The storage 730 may be a disk drive storage device. Although shown as a single unit, the storage 730 may be a combination of fixed and/or removable storage devices, such as fixed disc drives, removable memory cards, or optical storage, network attached storage (NAS), or a storage area-network (SAN).

Illustratively, the memory 720 includes a signature translation component 722 and a query/analysis tool 724. The storage 730 includes signature definitions 732, application packages and application metadata 734, and signature evaluation data 736. The signature translation component 722 translates the source code of malware signatures stored in the signature definitions 732 into database queries. Once translated, the query/analysis tool 724 may be configured to execute the queries against the application packages/metadata 734 to identify what packages the signature will identify as being an instance of malware corresponding to that signature. Further, the query/analysis tool 724 may generate signature evaluation data 736 indicating the effectiveness of a given signature.

As described, embodiments presented herein provide techniques for testing the effectiveness of a malware signature. Advantageously, the metadata driven techniques discussed above rapidly determine how well a candidate signature can identify malware. Further, the approaches presented herein allow a candidate signature to be tested against millions of mobile application packages (or "apps") in minutes rather than hours using a fraction of resources required for a traditional scan of physical files.

In one embodiment, a query tool is configured to translate a malware signature definition into a database query. The query is then executed against the database of application features to identify software packages that the signature would identify as malware. The results of the query are compared with threat information stored in the database and classified as being true/false positives and true/false negatives. By building the application feature database and converting a candidate malware signature to a database query, a list of "apps" or packages detected by the candidate signature may be obtained by running a query against a database.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet. In context of the present invention, a cloud based application may be configured to evaluate malware signature definitions by translating such signatures into a database query and executing the query against a feature database to identify what applications the candidate signature will categorize as malware.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for evaluating malware signatures, the method comprising:
receiving a candidate malware signature specified in a markup language, wherein the candidate malware signature specifies a set of features associated with one or more files of a software application package used to identify a malware application corresponding to the candidate malware signature;
translating the set of features candidate malware signature into a database query;
executing the database query to identify a set of applications detected by the candidate malware signature as being an instance of a malware threat corresponding to the candidate malware signature; and
for each application in the set of applications:
determining whether the application was correctly identified by the candidate malware signature as instance of the malware threat based on a previous classification of the application as being an instance of the malware threat or not being an instance of the malware threat.

2. The method of claim 1, further comprising, determining a number of false-positive malware detections made by the candidate malware signature.

3. The method of claim 1, further comprising, determining a number of false-negative malware detections made by the candidate malware signature.

4. The method of claim 1, further comprising, generating a profile measuring a performance of the candidate malware signature in detecting the malware threat corresponding to the candidate malware signature.

5. The method of claim 1, further comprising, revising the candidate malware signature to reduce a count of false-positive malware detections made by the candidate malware signature.

6. The method of claim 1, wherein the query is executed against a database storing features characterizing the set of applications.

7. The method of claim 1, further comprising:
crawling one or more application marketplaces to obtain the set of applications; and
extracting a set of metadata features characterizing the set of applications.

8. The method of claim 1, wherein the markup language in the YAML markup language and the query is a relational database query.

9. The method of claim 7, wherein the application marketplaces host applications for distribution to mobile devices.

10. A non-transitory computer-readable storage medium storing instructions, which, when executed on a processor, performs an operation for evaluating malware signatures, the operation comprising:
receiving a candidate malware signature specified in a markup language, wherein the candidate malware signature specifies a set of features associated with one or more files of a software application package used to identify a malware application corresponding to the candidate malware signature;
translating the candidate malware signature into a database query;
executing the database query to identify a set of applications detected by the candidate malware signature as being an instance of a malware threat corresponding to the candidate malware signature; and
for each application in the set of applications:
determining whether the application was correctly identified by the candidate malware signature as instance of the malware threat based on a previous classification of the application as being an instance of the malware threat or not being an instance of the malware threat.

11. The computer-readable storage medium of claim 10, wherein the operation further comprises, determining a number of false-positive malware detections made by the candidate malware signature.

12. The computer-readable storage medium of claim 10, wherein the operation further comprises, determining a number of false-negative malware detections made by the candidate malware signature.

13. The computer-readable storage medium of claim 10, wherein the operation further comprises, generating a profile measuring a performance of the candidate malware signature in detecting the malware threat corresponding to the candidate malware signature.

14. The computer-readable storage medium of claim 10, wherein the operation further comprises, revising the candidate malware signature to reduce a count of false-positive malware detections made by the candidate malware signature.

15. The computer-readable storage medium of claim 10, wherein the query is executed against a database storing features characterizing the set of applications.

16. The computer-readable storage medium of claim 10, wherein the operation further comprises:
   crawling one or more application marketplaces to obtain the set of applications; and
   extracting a set of metadata features characterizing the set of applications.

17. A system, comprising:
   a processor; and
   a memory hosting an application, which, when executed on the processor, performs an operation for evaluating malware signatures, the operation comprising:
      receiving a candidate malware signature specified in a markup language, wherein the candidate malware signature specifies a set of features associated with one or more files of a software application package used to identify a malware application corresponding to the candidate malware signature,
      translating the candidate malware signature into a database query,
      executing the database query to identify a set of applications detected by the candidate malware signature as being an instance of a malware threat corresponding to the candidate malware signature, and
      for each application in the set of applications:
         determining whether the application was correctly identified by the candidate malware signature as instance of the malware threat based on a previous classification of the application as being an instance of the malware threat or not being an instance of the malware threat.

18. The system of claim 17, wherein the operation further comprises:
   determining a number of false-positive malware detections made by the candidate malware signature; and
   determining a number of false-negative malware detections made by the candidate malware signature.

19. The system of claim 17, wherein the operation further comprises, generating a profile measuring a performance of the candidate malware signature in detecting the malware threat corresponding to the candidate malware signature.

20. The system of claim 17, wherein the operation further comprises, revising the candidate malware signature to reduce a count of false-positive malware detections made by the candidate malware signature.

21. The system of claim 17, wherein the query is executed against a database storing features characterizing the set of applications.

22. The system of claim 17, wherein the operation further comprises:
   crawling one or more application marketplaces to obtain the set of applications; and
   extracting a set of metadata features characterizing the set of applications.

* * * * *